March 27, 1973     P. HERZHOFF ET AL     3,723,343
APPARATUS FOR RECONVERTING FOAM TO THE INITIAL LIQUID
Filed Aug. 11, 1970
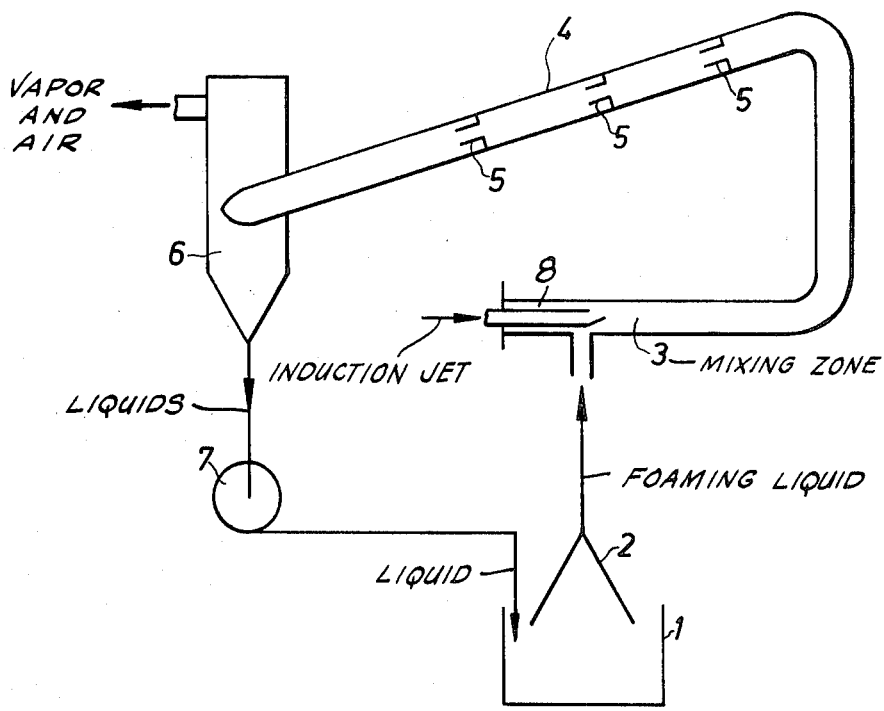
INVENTORS:
PETER HERZHOFF   HANS GREF   FRITZ MAUS   HANS FRENKEN
JOSEF FRIEDSAM   WOLFGANG SCHWEICHER
BY Connolly and Hutz
their attorneys

United States Patent Office 3,723,343
Patented Mar. 27, 1973

---

3,723,343
APPARATUS FOR RECONVERTING FOAM TO THE INITIAL LIQUID
Peter Herzhoff, Leverkusen, Hans Gref and Fritz Maus, Cologne, Hans Frenken, Leverkusen-Schlebusch, Josef Friedsam, Langenfeld, and Wolfgang Schweicher, Leverkusen, Germany, assignors to Agfa-Gevaert Aktiengesellschaft, Leverkusen, Germany
Filed Aug. 11, 1970, Ser. No. 62,881
Claims priority, application Germany, Sept. 13, 1969, P 19 46 418.7
Int. Cl. B01d 19/00
U.S. Cl. 252—361    8 Claims

ABSTRACT OF THE DISCLOSURE

A physical foam-reconverting apparatus in which the foaming liquid is mixed with vapour flowing at high speed and is exposed to such a pressure drop that turbulent flow occurs. With the mixing of the foam with the vapour, first of all some of the vapour condenses, and this then boils out again towards the end of the pressure drop. The liquid which is released in this manner from the foam should as far as possible be under such a pressure that its relevant boiling temperature corresponds to the temperature of the initial liquid from which foam is to be removed.

---

This invention relates to a process and apparatus for reconverting foam to the initial liquid by means of vapour flowing at high speed. It is known that liquids which foam strongly can be provided with suitable additives, e.g. silicones, for destroying the foam. Processes are also known in which the foam is introduced into an auxiliary medium flowing at high speed, e.g. gases or vapours. The foam is in addition broken up in the flowing auxiliary medium. It is also known to subject the foam together with the auxiliary medium to a cyclone flow. The known apparatus are not effective when liquids with a very strong foaming action, for example photographic emulsions containing wetting agents, are to have their foam destroyed.

The present invention has for an object to develop a process with which the foam of such liquids can also be effectively destroyed. The liquid which is recuperated from the foam is then to be supplied again to the production process.

The object is achieved according to the invention by the fact that, with the mixing of the foam with the quickly flowing vapour, some of the vapour is condensed, and this foam-vapor condensate mixture then passes in turbulent flow through a pressure drop, in which the condensed vapour fractions boil out again.

The liquid from which the foam is removed is advantageously under such a pressure that its relevant boiling temperature agrees with the temperature of the liquid the foam of which is to be destroyed.

The apparatus for carrying out the foam-removing process comprises a foam-vapour mixing zone, a foam-removing tube, a centrifugal separator and a liquid pump. According to the invention, the foam-removing tube is constructed as a long tube with a length/diameter ratio of at least 50.

According to another embodiment, the foam-removing tube is constructed as a short tube with a length/diameter ratio of about 10 to 20 and is provided with at least one throttling point. In such a case, the throttling point consists of a short tube section with a length/diameter ratio of 1.5 to 5 and a diameter of ¼ to ⅔ of the foam-removing tube. The indicated ranges have proved to be very advantageous when carrying into effect the process according to the invention. However, the top and bottom values are not to be considered as strict limits.

One particular advantage of the invention is that the foaming liquid is reformed with low thermal loading into the initial liquid and is again made available for the production process.

One embodiment of the apparatus according to the to the invention is shown by way of example in the drawing. The means used in the process acccording to the invention are more fully explained by reference to the drawing.

A foaming liquid with a growing mushroom of foam is disposed in a vessel 1, which liquid would flow over the rim of the vessel if a foam-destroying process were not used. By means of a funnel-shaped suction bell 2, the foam is continuously drawn off by suction and transported by induction jet 8 into the mixing zone 3 of the foam-destroying apparatus. Vapour is steam injected into the foam through induction jet 8. In our example, the temperature of the liquid from which the foam is to be removed is about 38° C. As it enters the mixing zone, the foam has approximately the temperature of the liquid in the vessel 1. The pressure in the mixing zone 3 is above the value at which the liquid would boil at this temperature. Typical pressure and temperature values for the mixing zone 3 are 150 mm. Hg and 50° C. The effect achieved in this way is that some of the vapour injected or sprayed into the foam condenses. The foam-vapour condensate mixture now travels with a turbulent flow through the foam-removing tube 4, in which there is a pressure drop. The higher pressure is at the inlet end. In the example illustrated, the foam-removing tube is provided with throttling positions 5, which are formed by short tube sections having a length/diameter ratio between 1.5 and 5, advantageously at 2, and a diameter which is ¼ to ⅔, advantageously half, the diameter of the foam-removing tube. The short tube sections extend axially through diaphragm plates disposed within and perpendicularly across foam-removing tube 4 to constitute short abrupt tubular nozzles 5. The reduction of the pressure in the foam-removing tube 4 relatively to the mixing zone 3 results in a boiling of the foam and simultaneous vaporisation of the condensed vapour fraction, so that the condensed vapour fraction has again been liberated before the separator 6 is reached. Typical pressure and temperature values on the inlet side of the foam-removing tube are 92 mm. Hg and 50° C. From the boiling foam and under the shearing effect of the vapour-air mixture flowing at high speed in the centre of the foam-removing tube 4, a lamella of liquid is developed on the wall of the said tube. The liquid and vapour-air mixture can now be separated in known manner in a centrifugal separator. This liquid is now in the separator under such a pressure that its boiling temperature corresponds to the temperature of that liquid in the vessel 1 from which foam is to be removed. In the example described, these pressure and temperature values are at 50 mm. Hg and 38° C. In this way, the liquid which is recuperated from the foam can be supplied without any difficulty from the separator 6 and through a pump 7 to the process again.

The vapour-air mixture discharging from the separator 6 is condensed in known manner in a condenser which is not shown and compressed by means of a water ring pump, also not shown, to atmospheric pressure.

What is claimed is:

1. An apparatus for reconverting foam to its initial liquid comprising a container for a mixture of said liquid and said foam, a foam-vapour mixing zone, a jet pump for withdrawing said mixture and injecting it into said zone, an elongated foam removing tube having an inlet end connected to said foam-vapour mixing zone, said tube having a series of several foam-destroying sections, each of said foam-destroying sections comprising a short abrupt tubular nozzle section axially disposed within and across said tube, said tube having an outlet end, a centrifugal separator having separate liquid and vapor outlets, said outlet end of said tube being connected to discharge into said centrifugal separator, a pump having an inlet and an outlet, said inlet of said pump being connected to the liquid outlet of said separator and a suction pump to the vapour outlet of said separator whereby the pressure is lowered in said tube from said outlet end to said inlet end, and the outlet of said pump being connected to recirculate separated liquid into said container whereby the percentage of liquid in said mixture is increased.

2. An apparatus as set forth in claim 1 whereby the foam-removing tube has a length/diameter ratio of about 20 to 30.

3. An apparatus as set forth in claim 1 wherein at least three of said throttling restrictions are provided in the throttling section of said foam-removing tube.

4. An apparatus as set forth in claim 1 wherein each of said short abrupt tubular nozzle sections has a length/diameter ratio of about 1.5 to 5.

5. An apparatus as set forth in claim 1 wherein set jet pump is an induction jet pump connected between said container and said foam-removing tube for supplying said mixture to said tube.

6. An apparatus as set forth in claim 1 wherein said short abrupt tubular nozzles each comprise a diaphragm plate disposed within and substantially perpendicular to said elongated foam removing tube and a short tube section disposed axially within said elongated foam removing tube.

7. An apparatus as set forth in claim 1 wherein each of said tubular nozzles has a diameter ranging from about ¼ to ⅔ the diameter of said foam-removing tube.

8. An apparatus as set forth in claim 1 wherein each of said short abrupt tubular nozzle sections has a length/diameter ratio of about 1.5 to 5.

References Cited
UNITED STATES PATENTS

| | | | |
|---|---|---|---|
| 2,467,769 | 4/1949 | Morrow et al. | 159—2 |
| 2,853,127 | 9/1958 | Sessen | 159—47 |
| 3,073,380 | 3/1962 | Palmason | 159—49 |
| 3,469,617 | 9/1969 | Palmason | 159—47 |
| 3,512,570 | 5/1970 | Ess et al. | 252—361 X |

FOREIGN PATENTS

| | | |
|---|---|---|
| 1,019,482 | 2/1966 | Great Britain. |

NORMAN, YUDKOFF, Primary Examiner

J. SOFER, Assistant Examiner